UNITED STATES PATENT OFFICE.

VALERIUS KOBELT, OF BERLIN, GERMANY.

PROCESS OF PURIFYING WATER.

1,274,560.  Specification of Letters Patent.  Patented Aug. 6, 1918.

No Drawing. Original application filed February 26, 1912, Serial No. 680,132. Divided and this application filed August 14, 1912. Serial No. 715,072.

*To all whom it may concern:*

Be it known that I, VALERIUS KOBELT, a subject of the King of Prussia, and resident of Berlin, Germany, have invented certain new and useful Improvements in Processes of Purifying Water, of which the following is a specification.

In the purification of water various crystalline substances both natural and artificial have been heretofore used such as for example, the natural and artificial zeolites, mica, etc. According to the novel process of the present invention, water is purified by the use, instead of such crystalline bodies as those indicated, of amorphous substances obtained from natural rock, and particularly from porous volcanic rock, namely the so-called allophanoids. These in their purifying action considerably surpass the crystalline zeolites and other agents heretofore used.

The allophanoids are non-crystalline minerals, sometimes called amorphous glass and their main constituents are alumina, silicic acid and water.

According to the present invention these allophanoids which are in their nature amorphous and colloidal are used for the purification of water, highly advantageous results being thus obtained.

Such amorphous bodies, the use of which forms the subject of the present invention and which for the purpose of this invention are hereinafter referred to as the purifying medium, are not crystalline minerals, but are the non-crystalline or amorphous constituents found in nature in certain volcanic rocks and in Germany are generally termed "gesteinsgläser." Whereas the zeolites as well as the crystalline products hitherto proposed for the purification of water represent chemical compounds, the "gesteinsgläser" are mixtures of extremely varying composition which during their formation never reach the stage of solid chemical compounds and which in the art or science were consequently termed as solid solution. The main constituents of the purifying medium, used according to this invention are aluminium, silicic acid, water and metals (preferably alkalis and earth alkalis) the quantitative relation of these constituents varying within wide limits.

From the artificial or also from the natural zeolites these substances differ distinctly by their behavior with regard to acids.

Whereas all zeolites artificial or natural show the feature characteristic for all zeolites viz: of being decomposed by hydrochloric acid forming a silicious jelly, this purifying medium is practically indifferent to diluted hydrochloric acid which shows that this medium is not a zeolite and that it does not contain any zeolites, although it is affected by concentrated acid when heated, in which case the bases (alkalis, earth alkalis) are gradually dissolved out but can be re-introduced by subsequent treatment with alkali solutions.

The allophanoids used according to the process of the present invention can be obtained from porous volcanic rock by grinding this rock to a fine condition and separating the allophanoids from the finely ground material by elutriation. The finely ground material may in the same way be mixed with water and agitated or made up into a paste and diluted with water and the finer and lighter constituents removed by decanting from the heavier material which separates and settles to the bottom. The separation can advantageously be carried out in a series of steps by agitating the material in water which flows continuously from one receptacle to another carrying with it the lighter constituents from which the heavier impurities settle gradually. In this way the lighter material containing the allophanoids becomes purer and purer and a substance is obtained which consists essentially of the active material with only a very small amount of the inactive material or none at all.

The allophanoids thus obtained can be used for freeing water quantitatively from lime salts and magnesia salts by simply filtering the water through it.

Again the allophanoids can be mixed with the water and allowed to settle. Other impurities can also be removed such as for example, iron oxid and manganese protoxid.

The process of purifying water by the use of allophanoids by filtering the water from this material has been found to be much more efficient than processes in which the crystalline silicates are used. The efficiency of the present process is 65 per cent. greater than other processes using hydrated or crystalline purifying agents and the size of the purification plant or of the filter body can be correspondingly decreased. A further advantage of the process of the present invention is that undesirable purifying tendencies are counteracted.

This application is a division of my application Ser. No. 680,132, filed February 26, 1912.

I claim:

1. The process of purifying water, which comprises subjecting the water to the action of the natural, non-crystalline, colloidal allophanoid (gesteinsgläser) constituents of volcanic rocks freed from granular and inactive materials.

2. The process of purifying water, which comprises subjecting the water to the action of natural non-crystalline colloidal allophanoid (gesteinsgläser) freed from granular material and impurities.

3. The process of purifying water, which comprises subjecting the water to the action of natural non-crystalline, colloidal allophanoid (gesteinsgläser) washed free from granular material and impurities, said allophanoid being insoluble in dilute hydrochloric acid.

4. The process of purifying water which comprises subjecting the water to the active constituents only of natural non-crystalline colloidal allophanoids and freed from granular and inactive materials, said active constituents being insoluble in dilute hydrochloric acid and non-freezing.

In testimony whereof I affix my signature in presence of two witnesses.

VALERIUS KOBELT.

Witnesses:
 HENRY HASPER,
 ARTHUR SCHROEDER.